United States Patent [19]

Brolund et al.

[11] 4,033,216

[45] July 5, 1977

[54] DUPLICATING PUNCH PRESS WITH STYLUS CONTROL

[75] Inventors: Theodore F. Brolund; James F. Helgert, both of Rockford, Ill.

[73] Assignee: W. A. Whitney Corporation, Rockford, Ill.

[22] Filed: Sept. 24, 1976

[21] Appl. No.: 726,246

[52] U.S. Cl. .................................. 83/413; 83/396
[51] Int. Cl.[2] ................................... B26F 1/02
[58] Field of Search ............ 83/413, 410, 396, 565

[56] References Cited

UNITED STATES PATENTS

| 1,637,013 | 7/1927 | Thomas | 83/413 X |
| 3,815,462 | 6/1974 | Kaufmann | 83/413 X |

*Primary Examiner*—J. M. Meister
*Attorney, Agent, or Firm*—Leydig, Voit, Osann, Mayer & Holt, Ltd.

[57] ABSTRACT

A stylus is mounted on a carriage which also supports a work plate adapted to be positioned beneath a punch. When the punch first strikes the work plate, the stylus is automatically retracted out of a hole in a template so as to free the carriage to shift forwardly in unison with the work plate as the punch continues through the plate.

2 Claims, 3 Drawing Figures

DUPLICATING PUNCH PRESS WITH STYLUS CONTROL

BACKGROUND OF THE INVENTION

This invention relates to a duplicating punch press of the same general type as disclosed in Brolund U.S. Pat. application Ser. No. 570,762, filed Apr. 23, 1975 and assigned to the assignee of the present invention. In such a press, holes are punched in a workpiece in locations determined by the positions of previously formed holes in a template.

The press includes a carriage having one or more clamps for holding the workpiece and adapted to be moved to locate the workpiece beneath the punch of the press. Movable with the carriage is a plunger or stylus which is adapted to be advanced into and retracted from the holes in the template.

When punching a hole in the workpiece, the carriage is moved until the stylus is alined with a selected hole in the template. The stylus then is advanced into the selected hole and serves to hold the carriage and the workpiece in a fixed position while the workpiece is being punched.

The press disclosed in the aforementioned application functions well in most instances but difficulty is encountered when heavy gauge workpieces are being punched. As the punch drives through a heavy workpiece, the frame of the press deflects and causes the punch to exert a horizontal force on the workpiece. The workpiece carriage is held in a stationary position by virtue of the stylus being located in the hole in the template and thus the horizontal force applied to the workpiece as a result of frame deflection can cause either shifting of the workpiece within the workpiece clamps or shifting of the clamps on the carriage. Such shifting changes the position of the workpiece relative to the carriage and thus the following holes will be punched at improper locations in the workpiece.

SUMMARY OF THE INVENTION

The primary aim of the present invention is to provide a new and improved punch press in which the workpiece carriage is locked in a fixed position until the punch first strikes the workpiece and then is released for horizontal movement as the punch drives through the workpiece. Being thus released, the carriage is free to float when the press frame deflects so that shifting of the workpiece relative to the carriage is avoided.

A more detailed object is to achieve the foregoing by providing a press in which the stylus is automatically retracted from the template hole in response to the punch initially striking the workpiece, the stylus thereby being released from the template and leaving the carriage free to float when the press frame deflects.

The invention also resides in the novel manner of sensing contact of the punch with the workpiece and of retracting the stylus automatically as an incident to such contact.

These and other objects and advantages of the invention will become more apparent from the following detailed description when taken in conjunction with the accompanying drawings.

DETAILED DESCRIPTION OF THE PREFERRED EMBODIMENT

Figure 3:
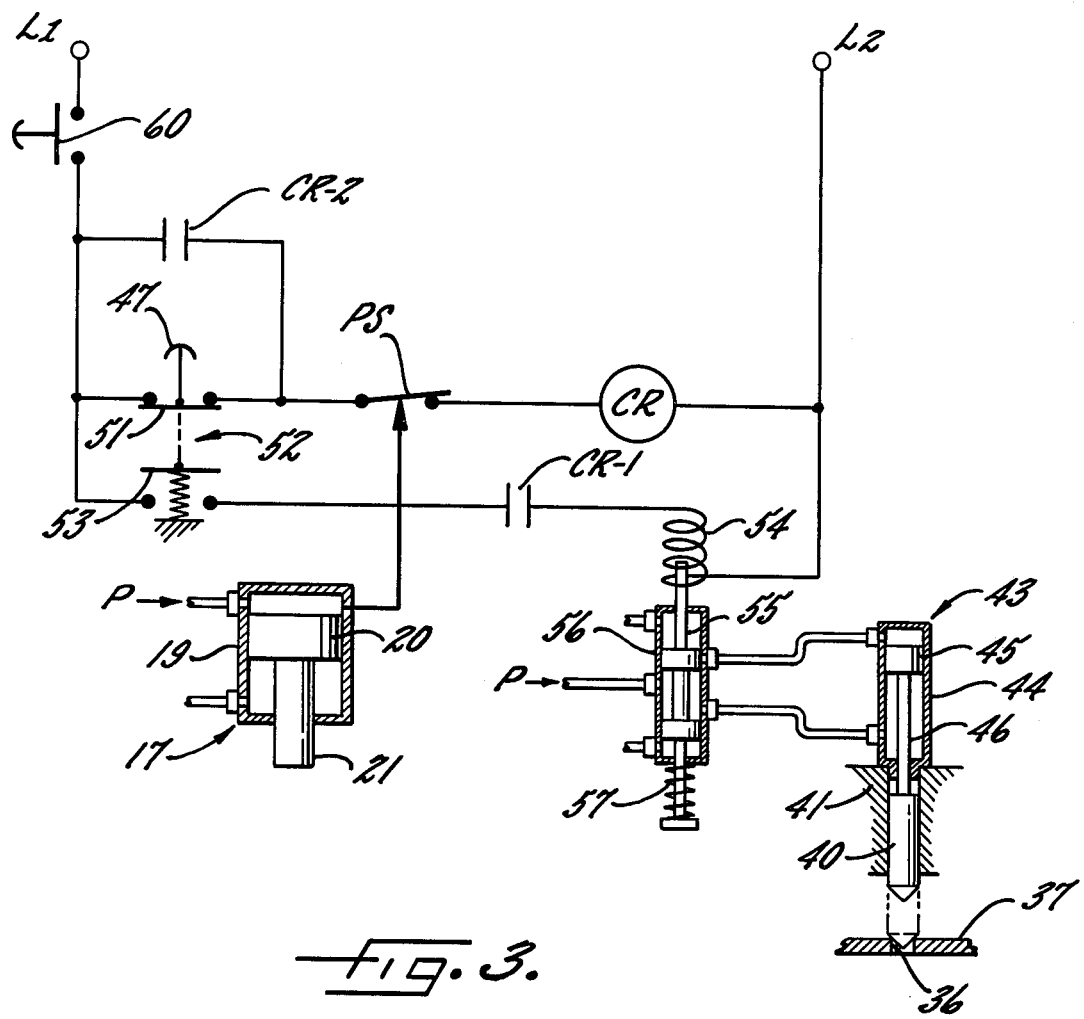
FIG. 3 is a diagram of electrical and pneumatic circuits for controlling advancement and retraction of the stylus.

As shown in the drawings for purposes of illustration, the invention is embodied in a punch press 10 for punching holes 11 in a workpiece such as a metal plate 13. The press is generally similar to that disclosed in the aforementioned application and includes a C-shaped frame 14 having an upper arm 15 and a lower arm (not shown). A punch 16 projects downwardly from the upper arm and is adapted to be reciprocated upwardly and downwardly by a hydraulic actuator 17 (FIG. 3) comprising a cylinder 19, a piston 20 and a ram 21. The punch is carried on the lower end of the ram and is advanced downwardly when pressurized oil is admitted into the upper end of the cylinder. A die (not shown) is fixed to the lower arm of the C-frame 14 and coacts with the punch to form the holes 11.

Figure 1:
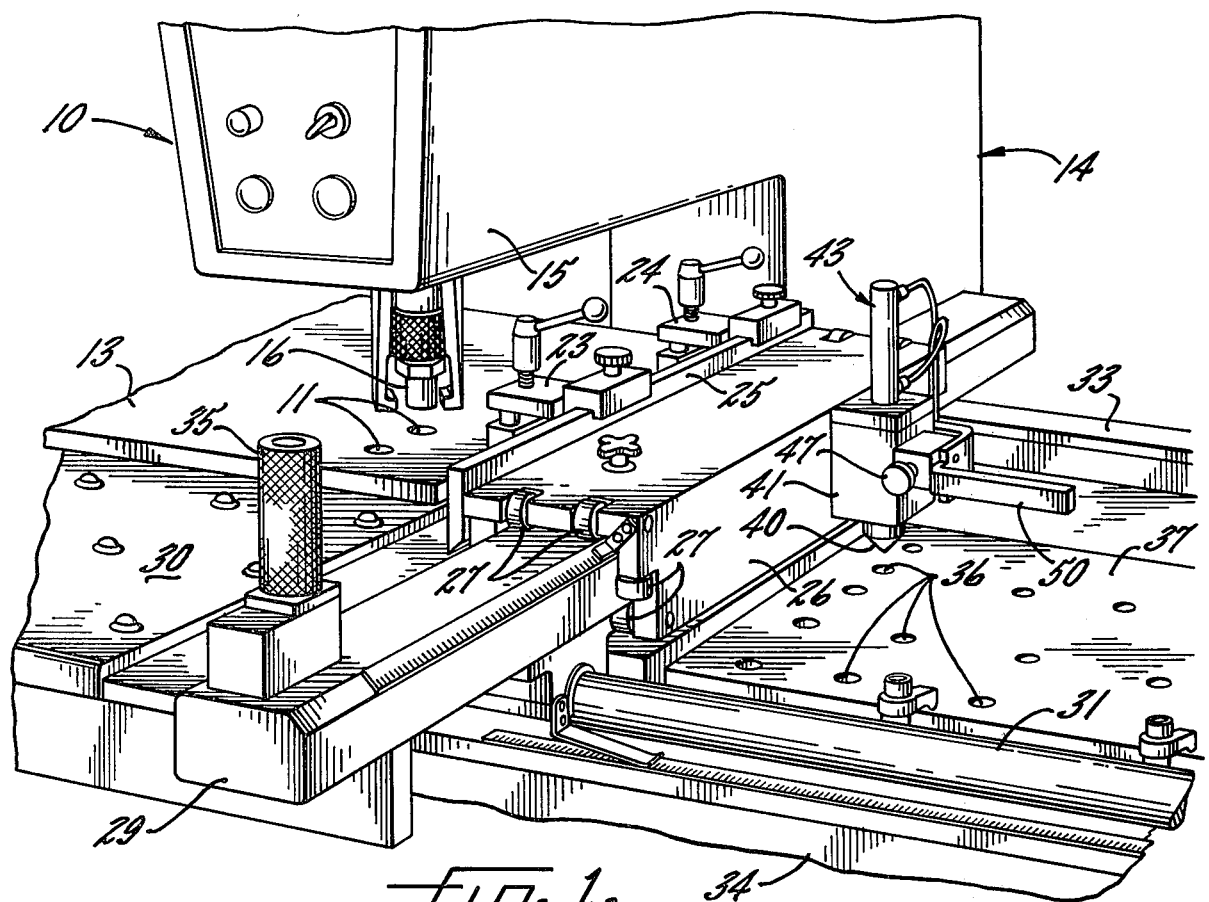
FIG. 1 is fragmentary perspective view of a new and improved punch press incorporating the unique features of the present invention.
Figure 2:
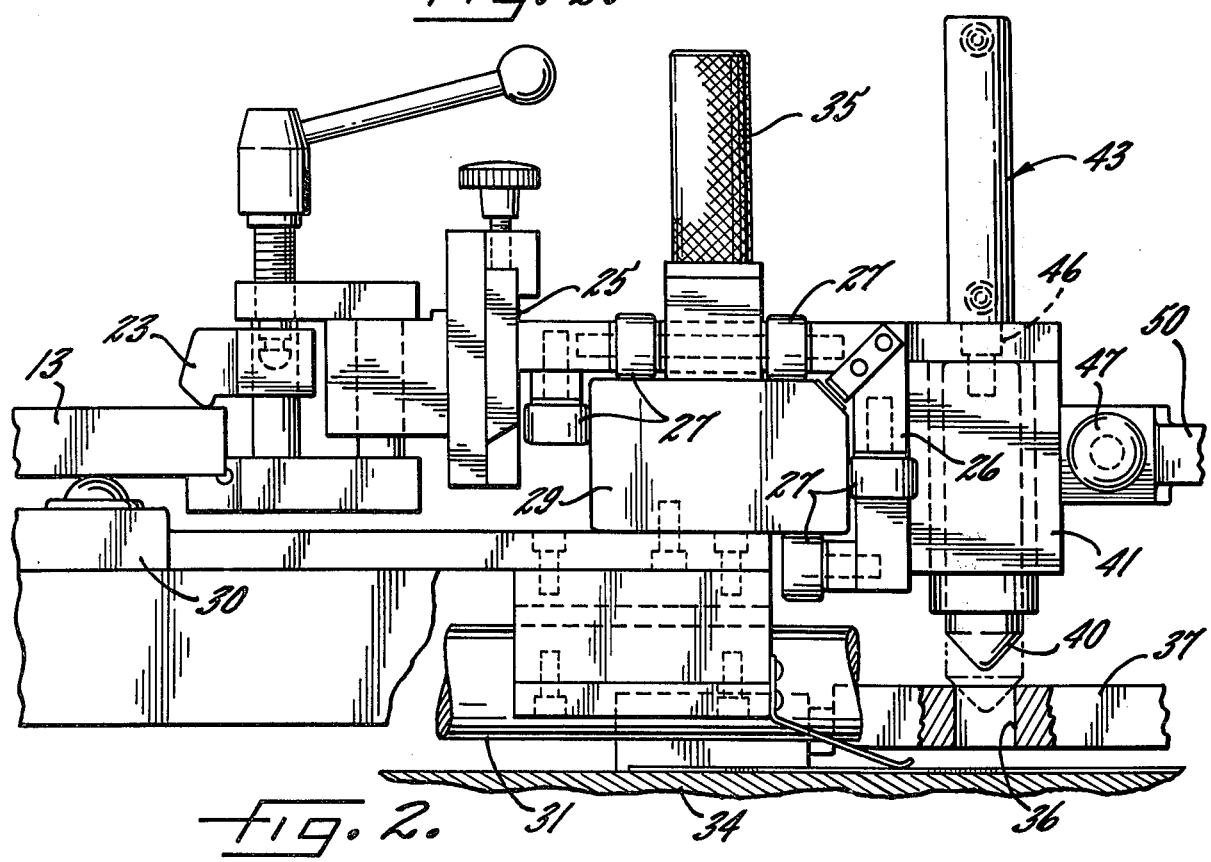
FIG. 2 is an enlarged front elevation of parts shown in FIG. 1.

The work plate 13 is adapted to be held along one edge by releasable front and rear clamps 23 and 24 (FIG. 1) which are adjustably secured to a rail 25 fixed to one side of a generally L-shaped carriage 26. As shown in FIG. 2, rollers 27 are mounted on the carriage and are positioned to ride along a beam 29 which extends in a fore-and-aft direction. Thus, the beam 29 supports and guides the carriage for back and forth movement to enable the work plate 13 to be shifted to various fore-and-aft positions beneath the punch 16.

To enable the work plate 13 to be shifted in the lateral direction, the beam 29 is carried on a table 30 which underlies the plate and which is guided to move laterally along a forward rod 31 and a rear bar 33, the rod and the bar being fixed to a bed 34. An upwardly projecting handle 35 is secured to the beam and may be used by the operator to shift the table 30 along the bed 34 and thereby establish the lateral position of the work plate beneath the punch 16.

The press 10 is of the duplicating type in that the holes 11 in the work plate 13 are formed in positions determined by the locations of holes 36 previously punched in a template 37. The template 37 is clamped to the bed 34 below and adjacent the carriage 26 and preferably but not necessarily is formed by a plate identical to the work plate 13 and having holes 36 formed by dimensionally locating the template in various positions beneath the punch 16 prior to securing the template to the bed.

To enable the template 37 to be used to locate the position of the work plate 13, a stylus 40 is mounted on one side of the carriage 26 to move therewith and is adapted to be advanced into and retracted from the various holes 36 in the template. Herein, the stylus is in the form of a vertical plunger having a tapered lower end and supported for up and down movement within a housing 41 on one side of the carriage 26. Advancement and retraction of the stylus is effected by a fluid-operated actuator 43 comprising a pneumatic cylinder 44 (FIG. 3) secured to the housing 41 and slidably supporting a piston 45 and a rod 46, the latter being secured to the upper end of the stylus 40. When the operator depresses a spring-loaded control button 47 (FIG. 1) on the housing 41, the rod 46 is shifted downwardly to advance the stylus 40 into one of the template holes 36. Release of the buttom results in retraction of the stylus. A handle 50 is supported on the carriage 26 alongside the button and may be used to shift the carriage back and forth along the beam 29.

With the foregoing arrangement, the operator uses the handles 35 and 50 to shift the carriage 26 and the table 30 until the stylus 40 is aligned vertically with a selected hole 36 in the template 37. The operator then depresses the control buttom 47 to cause the stylus to telescope downwardly into the hole 36. As a result of such telescoping, the stylus locks the carriage 26 and the table 30 in a stationary position and thus the work plate 13 is held in a rigidly fixed position beneath the punch 16 so that the hole 11 in the work plate will be formed in a location determined by the hole 36 in the template 37. Once the work plate has been located by the stylus, the operator causes the punch to advance and form the hole 11. After the stylus has been released from the first hole 36, the carriage 26 and table 30 are shifted to position the stylus over another template hole 36 preparatory to punching the next hole 11 in the work plate 13.

In accordance with the present invention, the stylus 40 is automatically retracted out of the template hole 36 when the punch 16 first strikes the work plate 13 and before the punch drives completely through the plate. As a result, the stylus 40 keeps the work plate 13 rigidly fixed and accurately located until the punch has started the hole 11 but then frees the carriage 26 and the work plate for forward shifting as the punch continues through the hole. The ability of the workpiece to shift forwardly is important since the upper arm 15 of the C-frame 14 deflects upwardly and the lower arm of the C-frame deflects downwardly as a result of the force created when the punch strikes the work plate. Because of such deflection, the punch imposes a forwardly directed force on the work plate and, unless the carriage 26 is free to move forwardly, that force may pull the work plate 13 forwardly within the clamps 23 and 24 or may pull the clamps forwardly along the rail 25. In either case, the position of the work plate 13 would change relative to the carriage 26 and would lead to inaccurate positioning of the work plate during the punching of subsequent holes 11. But, with the carriage 26 free to shift forwardly as a result of the stylus 40 being automatically retracted, the work plate remains in a constant position relative to the carriage so that a succession of holes 11 may be punched in accurate locations.

In carrying out the invention, automatic retraction of the stylus 40 is effected in response to a build up of pressure in the upper end of the cylinder 19 for actuating the punch 16, such pressure building up when the punch first strikes the work plate 13. For this purpose, a pressure-responsive switch PS (FIG. 3) is associated with the upper end of the cylinder 19 and is connected across lines $L_1$ and $L_2$ adapted to be energized by a suitable source of voltage. A relay coil CR is connected in series with the pressure switch PS and with one set of normally closed contacts 51 of a switch 52 adapted to be actuated by the control button 47, the switch also having a set of normally open contacts 53 connected across the lines $L_1$ and $L_2$ in parallel with the contacts 51. Connected in series with the contacts 53 are a solenoid 54 and a set of relay contacts CR-1 controlled by the coil CR. When the solenoid 54 is energized, it shifts the spool 55 of a four-way control valve 56 upwardly to admit pressurized air into the upper end of the cylinder 44 for the stylus 40 so as to effect downward advancement of the stylus. Upon de-energization of the solenoid 54, a spring 57 shifts the valve spool 55 downwardly to admit pressurized air into the lower end of the cylinder 44 and retract the stylus.

At the start of a punching cycle with the punch 16 at rest, with the cylinder 19 de-pressurized, and with the control button 47 released, the pressure switch PS and a main on-off switch 60 (FIG. 3) are in closed states and thus the relay coil CR is energized across the lines $L_1$ and $L_2$ and through the closed pressure switch and the closed switch contacts 51. With the relay coil CR energized, its contacts CR-1 are closed as are additional relay contacts CR-2 which serve to seal in the relay coil and keep the coil energized independently of the state of the switch 52.

After positioning the stylus 40 over the desired template hole 36, the operator depresses the push button 47 to open the switch contacts 51 and close the switch contacts 53. When the latter contacts close, the solenoid 54 is energized through the closed relay contacts CR-1 and thus shifts the valve spool 55 to advance the stylus 40 into the template hole 36.

While keeping the push button 47 depressed, the operator next causes pressure fluid to be admitted into the upper end of the cylinder 19 to advance the punch 16. When the punch strikes the work plate 13, the pressure in the upper end of the cylinder 19 builds up rapidly and, when the pressure reaches a predetermined value such as 500 psi., the pressure switch PS automatically opens to de-energize the relay coil CR and effect opening of the relay contacts CR-1. The solenoid 54 thus is de-energized to enable the spring 57 to shift the valve spool 55 downwardly and effect retraction of the stylus 40 from the template hole 36. Accordingly, the stylus is shifted clear of the template 37 and thus frees the carriage 26 and the work plate 13 to shift forwardly in unison as the punch 16 moves through the work plate and the C-frame 14 deflects. As a result, horizontal movement between the work plate and the carriage is avoided so as to insure that all succeeding holes 11 will be punched in accurate locations.

We claim:

1. A punch press for punching holes in a workpiece in locations determined by the position of holes in a template, said press comprising a punch, an actuator connected to said punch and selectively operable to advance said punch through said workpiece, a carriage having a clamp for holding said workpiece and adapted to be moved to locate said workpiece beneath said punch, a plunger mounted to move with said carriage, said plunger also being mounted to move relative to said carriage between a retracted position in which the plunger is spaced from said template and an advanced position in which the plunger is telescoped into one of said holes in said template, selectively operable means for moving said plunger to said advanced position prior to advancement of said punch, and means responsive to initial contact of said punch with said workpiece and operable to cause said plunger to automatically move to said retracted position as said punch continues to advance whereby said plunger is retracted out of said hole in said template to free said carriage, said clamp and said workpiece to shift in unison as said punch moves through said workpiece.

2. A punch press as defined in claim 1 in which said actuator comprises a cylinder which is operable to advance said punch in response to the admission of pressure fluid into one end of said cylinder, said responsive means sensing the pressure in said one end of said cylinder and causing said plunger to move to said retracted position when said pressure builds up to a predetermined value upon initial contact of said punch with said workpiece.

* * * * *